United States Patent
Michael et al.

(10) Patent No.: US 12,437,163 B2
(45) Date of Patent: Oct. 7, 2025

(54) SYSTEM AND METHOD FOR IDENTIFYING A USER INTENT IN A CODE-MIXED UTTERANCE OF A USER

(71) Applicant: US Technology International Private Limited, Thiruvananthapuram (IN)

(72) Inventors: Marykutty Michael, Thiruvananthapuram (IN); Boby Chaitanya Villari, Bengaluru (IN); Vijayalakshmi Iyer, Bengaluru (IN)

(73) Assignee: US Technology International Private Limited (IN)

( * ) Notice: Subject to any disclaimer, the term of this patent is extended or adjusted under 35 U.S.C. 154(b) by 162 days.

(21) Appl. No.: 18/415,068

(22) Filed: Jan. 17, 2024

(65) Prior Publication Data

US 2024/0320450 A1 Sep. 26, 2024

(30) Foreign Application Priority Data

Mar. 23, 2023 (IN) .............................. 202341020581

(51) Int. Cl.
*G06F 40/58* (2020.01)
*G06F 40/284* (2020.01)
*H04L 51/02* (2022.01)

(52) U.S. Cl.
CPC ............ *G06F 40/58* (2020.01); *G06F 40/284* (2020.01); *H04L 51/02* (2013.01)

(58) Field of Classification Search
CPC ...... G06F 40/58; G06F 40/284; G06F 40/295; G06F 40/30; G06F 40/35; G06F 40/44; H04L 51/02
See application file for complete search history.

(56) References Cited

U.S. PATENT DOCUMENTS

| 11,176,929 B1* | 11/2021 | Smith .................... G06F 40/58 |
| 2018/0165278 A1* | 6/2018 | He ........................ G06F 40/44 |
| 2023/0274098 A1* | 8/2023 | Syeda-Mahmood .... G06N 5/02 704/9 |
| 2023/0325612 A1* | 10/2023 | Ghatage ................ G06F 16/683 |

* cited by examiner

*Primary Examiner* — Huyen X Vo

(57) ABSTRACT

A method for identifying a user intent in a code-mixed utterance of a user is disclosed. The method includes receiving the code-mixed utterance from the user and segmenting the received code-mixed utterance into a set of tokens. The method also includes obtaining contextual information and contextual representations associated with the received code-mixed utterance and generating a fixed dimensional representation for each token of the set of tokens. Further, the method includes generating a set of vocabulary probabilities for the fixed dimensional representation and translating the code-mixed utterances to a translation text in the target language based on the generated set of vocabulary probabilities by using the AI-based LTN. Further, the method includes identifying the user intent in the translation text.

16 Claims, 7 Drawing Sheets

SYSTEM AND METHOD FOR IDENTIFYING A USER INTENT IN A CODE-MIXED UTTERANCE OF A USER

CROSS-REFERENCE TO RELATED APPLICATION(S)

This application claims priority from and the benefit of India Patent Application No. 202341020581 filed on Mar. 23, 2023, which is hereby incorporated by reference in its entirety.

FIELD OF THE INVENTION

The present invention generally relates to text processing, and more particularly relates to a system and a method for identifying a user intent in a code-mixed utterance of a user.

BACKGROUND

Artificial Intelligence (AI)-assisted conversational agents (AI chatbots or conversational agents) are computer applications powered by AI that are configured to engage in natural language conversations with humans. The AI chatbots are designed to interpret and generate human language, making them useful in a wide range of applications, such as Natural Language Understanding (NLU), response generation, dialogue management, and the like. With the advancements in technology, the AI chatbots are an accepted mode of communication today. The AI chatbots are trained to perform tasks/goals based on the application scope. Further, the success of such goal-oriented AI chatbots is dependent on their ability to understand the intent of a user and map it to a task that the AI chatbots are trained to perform.

In the context of a multi-lingual user (audience) who speaks multiple languages, the AI chatbots may confront a language-switched utterance wherein the user has used more than one language in a single sentence. Moreover, in certain multicultural communities, novel/unique vocabulary may also be used by the user which is specific to that language combination. For example, a Spanish-English language combination has a vocabulary that is unavailable in either English or Spanish alone. Similar unique words can also be found in the Hindi-English language combination and are being termed as "Hinglish" words. Also, in certain language mixtures like Spanish-English, the alphabet is closely matched with either the vocabulary of English or Spanish. However, the language interpretation methods may translate such language mixtures inaccurate if the context of such usage of words in a sentence is misinterpreted. In case where a user utters (types or speaks) words specific to mixed-language or in case where the user keeps switching between two languages where the alphabet is common, methods relying on language identification of the words may produce inaccurate interpretation of the user intent. Thus, the goal-oriented AI chatbots fail to interpret the user intent in a code-mixed utterance of the user. The code-mixed utterance of the user corresponds to spoken or written communication in which two or more languages or language varieties are mixed or combined within the same sentence, conversation, or text.

Also, training traditional single language/specific Base Language (BL) goal-oriented AI chatbots require large amounts of natural language intent data in a selected BL. However, to train a chatbot that comprehends code-mixed user utterances, such an approach of requiring the large amount of natural language intent data in the selected BL is detrimental due to one or more issues. Further, a large amount of training data is not available as code-mixing is mostly a spoken phenomenon. Also, there are multiple possible permutations of mixing two or more languages. As a result, the availability of such training data for a rarer language-mix is limited. Further, in order to speed up the training, testing, and implementation of such a mixed language goal-oriented chatbot, the requirement of specific language experts (domain experts) is crucial. However, it is very challenging to find such domain experts.

Moreover, within the realm of Automated Speech Recognition (ASR), there are existing solutions that address the identification of text in multiple languages, regardless of language dependence. Generally, Deep Neural Networks (DNN) are used to compute language agnostic bottleneck features in the context of a DNN-based multilingual system. Furthermore, forecasting a spoken language for cascading language-independent systems play a vital role in understanding code-mixed user utterances. However, these ASR-based systems face a set of challenges pertaining to pronunciation. For example, the development of language-specific backend pronunciation dictionaries and language models consumes a huge amount of time and performs large computation. Accordingly, the ASR-based systems face the challenges for identifying the user intent in code-switching i.e., code-mixed user utterances. Further, the ASR-based systems also fail to solve the problem of word-overlapping i.e., a situation where two or more words in a sentence share some common characters or are partially identical.

Accordingly, there is a need for a technique to overcome the above-identified problems.

SUMMARY

This summary is provided to introduce a selection of concepts, in a simplified format, that are further described in the detailed description of the invention. This summary is neither intended to identify key or essential inventive concepts of the invention nor is it intended for determining the scope of the invention.

According to one embodiment of the present disclosure, a method for identifying a user intent in a code-mixed utterance of a user is disclosed. The method includes receiving the code-mixed utterance from the user for performing one or more actions via a chatbot. The code-mixed utterance corresponds to one or more commands provided by the user to the chatbot in two or more source languages. Further, the method includes segmenting the received code-mixed utterance into a set of tokens by using an Artificial Intelligence (AI)-based Language Translator Network (LTN). The method also includes obtaining contextual information and contextual representations associated with the received code-mixed utterance based on the set of tokens by using the AI-based LTN. Also, the method includes generating a fixed dimensional representation for each token of the set of tokens based on the obtained contextual information and the obtained contextual representations by using the AI-based LTN. Furthermore, the method includes generating a set of vocabulary probabilities for the fixed dimensional representation associated with each token of the set of tokens by using the AI-based LTN. Each vocabulary probability of the set of vocabulary probabilities corresponds to probabilities associated with the vocabulary of a target language. The method includes translating the code-mixed utterances to a translation text in the target language based on the generated set of vocabulary probabilities by using the AI-based LTN.

Further, the method includes identifying the user intent in the translation text by using an AI-based Intent Detection Network (IDN).

According to another embodiment of the present disclosure, a system for identifying a user intent in a code-mixed utterance of a user is disclosed. The system includes one or more processors configured to receive the code-mixed utterance from the user for performing one or more actions via a chatbot. The code-mixed utterance corresponds to one or more commands provided by the user to the chatbot in two or more source languages. Further, the one or more processors are configured to segment the received code-mixed utterance into a set of tokens by using an Artificial Intelligence (AI)-based Language Translator Network (LTN). The one or more processors are configured to obtain contextual information and contextual representations associated with the received code-mixed utterance based on the set of tokens by using the AI-based LTN. Also, the one or more processors are configured to generate a fixed dimensional representation for each token of the set of tokens based on the obtained contextual information and the obtained contextual representations by using the AI-based LTN. Furthermore, the one or more processors are configured to generate a set of vocabulary probabilities for the fixed dimensional representation associated with each token of the set of tokens by using the AI-based LTN. Each vocabulary probability of the set of vocabulary probabilities corresponds to probabilities associated with the vocabulary of a target language. The one or more processors configured to translate the code-mixed utterances to a translation text in the target language based on the generated set of vocabulary probabilities by using the AI-based LTN. Further, the one or more processors are configured to identify the user intent in the translation text by using an AI-based Intent Detection Network (IDN).

To further clarify the advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 2:
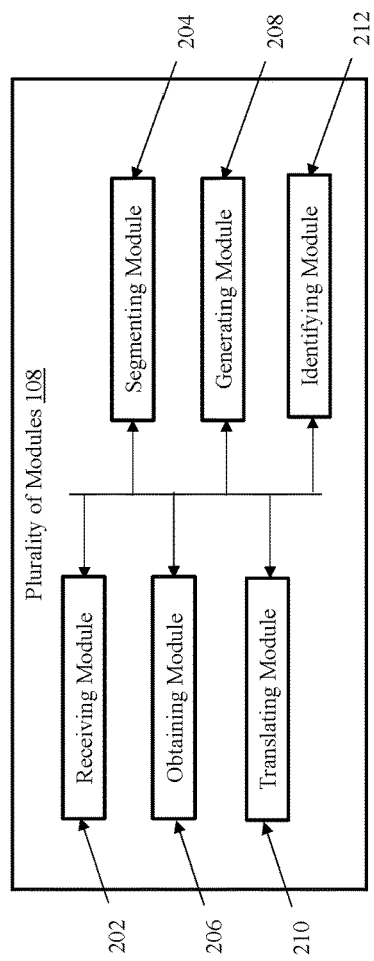
FIG. 2 illustrates a block diagram of a plurality of modules of the system at an electronic device for identifying the user intent in the code-mixed utterance of the user, according to an embodiment of the present disclosure.

Further, skilled artisans will appreciate those elements in the drawings are illustrated for simplicity and may not have necessarily been drawn to scale. For example, the flow charts illustrate the method in terms of the most prominent steps involved to help improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

For the purpose of promoting an understanding of the principles of the invention, reference will now be made to the various embodiments and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Figure 1:
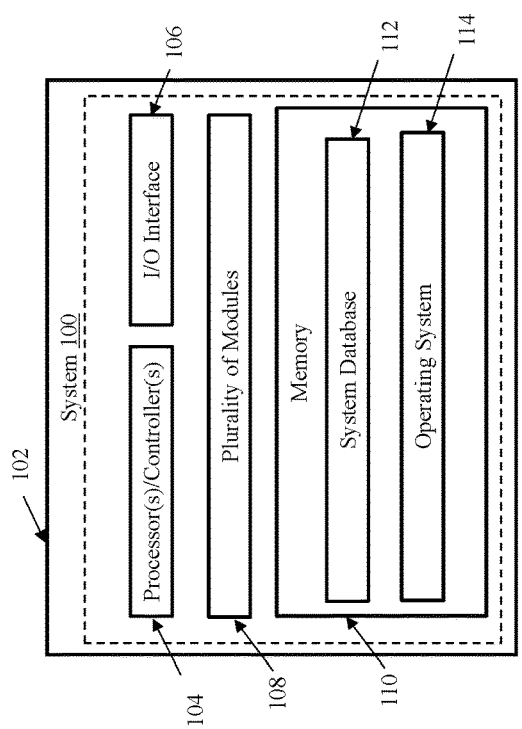
FIG. 1 illustrates a block diagram of a system for identifying a user intent in a code-mixed utterance of a user, according to an embodiment of the present disclosure.

FIG. 1 illustrates a block diagram of a system 100 for identifying a user intent in a code-mixed utterance of a user, according to an embodiment of the present disclosure. In an embodiment of the present disclosure, the code-mixed utterance corresponds to spoken or written communication in which two or more languages or dialects are combined within the same sentence, conversation, or text. In an embodiment of the present disclosure, the system is implemented in an electronic device 102. Examples of the electronic device 102 may include, but are not limited to, a smartphone, a laptop, a camera device, a smartwatch, and the like.

The system 100 may include one or more processors/controllers 104, an Input/Output (I/O) interface 106, a plurality of modules 108, and a memory 110.

In an exemplary embodiment, the one or more processors/controllers 104 may be operatively coupled to each of the respective I/O interface 106, the plurality of modules 108, and the memory 110. In one embodiment, the one or more processors/controllers 104 may include at least one data processor for executing processes in Virtual Storage Area Network. The one or more processors/controllers 104 may include specialized processing units such as integrated system (bus) controllers, memory management control units, floating point units, graphics processing units, digital signal processing units, etc. In one embodiment, the one or more processors/controllers 104 may include a Central Processing Unit (CPU), a Graphics Processing Unit (GPU), or both. The one or more processors/controllers 104 may be one or more general processors, digital signal processors, application-specific integrated circuits, field-programmable gate arrays, servers, networks, digital circuits, analog circuits, combinations thereof, or other now known or later developed devices for analyzing and processing data. The one or more processors/controllers 104 may execute a software program, such as code generated manually (i.e., programmed) to perform the desired operation. In an embodiment of the present disclosure, the processors/controllers 104 may be a general purpose processor, such as the CPU, an Application Processor (AP), or the like, a graphics-only processing unit such as the GPU, a Visual Processing Unit (VPU), and/or an Artificial Intelligence (AI)-dedicated processor, such as a Neural Processing Unit (NPU).

Further, the one or more processors/controllers 104 control the processing of input data in accordance with a predefined operating rule or machine learning (ML) model stored in the non-volatile memory and the volatile memory. The predefined operating rule or the ML model is provided through training or learning.

Here, being provided through learning means that, by applying a learning technique to a plurality of learning data, a predefined operating rule or the ML model of a desired characteristic is made. The learning may be performed in a device itself in which ML according to an embodiment is performed, and/or may be implemented through a separate server/system.

Furthermore, the ML model may consist of a plurality of neural network layers. Each layer has a plurality of weight values and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-network.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

The one or more processors/controllers 104 may be disposed in communication with one or more input/output (I/O) devices via the respective I/O interface 106. The I/O interface 106 may employ communication code-division multiple access (CDMA), high-speed packet access (HSPA+), global system for mobile communications (GSM), long-term evolution (LTE), WiMax, or the like, etc.

The one or more processors/controllers 104 may be disposed in communication with a communication network via a network interface. In an embodiment, the network interface may be the I/O interface 106. The network interface may connect to the communication network to enable the connection of the electronic device 102 with the other electronic devices. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network may include, without limitation, a direct interconnection, local area network (LAN), wide area network (WAN), wireless network (e.g., using Wireless Application Protocol), the Internet, and the like.

In an embodiment of the present disclosure, the one or more processors 104 are configured to receive the code-mixed utterance from the user for performing one or more actions via a chatbot. The code-mixed utterance corresponds to one or more commands provided by the user to the chatbot in two or more source languages. Further, the one or more processors 104 are configured to segment the received code-mixed utterance into a set of tokens by using an Artificial Intelligence (AI)-based Language Translator Network (LTN). The one or more processors 104 are configured to obtain contextual information and contextual representations associated with the received code-mixed utterance based on the set of tokens by using the AI-based LTN. Also, the one or more processors 104 are configured to generate a fixed dimensional representation for each token of the set of tokens based on the obtained contextual information and the obtained contextual representations by using the AI-based LTN. Furthermore, the one or more processors 104 are configured to generate a set of vocabulary probabilities for the fixed dimensional representation associated with each token of the set of tokens by using the AI-based LTN. Each vocabulary probability of the set of vocabulary probabilities corresponds to probabilities associated with the vocabulary of a target language. The one or more processors 104 are configured to translate the code-mixed utterances to a translation text in the target language based on the generated set of vocabulary probabilities by using the AI-based LTN. Further, the one or more processors 104 are configured to identify the user intent in the translation text by using an AI-based Intent Detection Network (IDN).

In some embodiments, the memory 110 may be communicatively coupled to the one or more processors/controllers 104. The memory 110 may be configured to store data, and instructions executable by the one or more processors/controllers 104. The memory 110 may include but is not limited to, a non-transitory computer-readable storage media, such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one example, the memory 110 may include a cache or random-access memory for the one or more processors/controllers 104. In alternative examples, the memory 110 be a part of the one or more processors/controllers 104, such as a cache memory of a processor, the system memory, or other memory. In some embodiments, the memory may be an external storage device or database for storing data. The memory 110 may be operable to store instructions executable by the one or more processors/controllers 104. The functions, acts, or tasks illustrated in the figures or described may be performed by the programmed processor/controller for executing the instructions stored in the memory 110. The functions, acts or tasks are independent of the particular type of instruction set, storage media, processor, or processing strategy and may be performed by software, hardware, integrated circuits, firmware, micro-code, and the like, operating alone or in combination. Likewise, processing strategies may include multiprocessing, multitasking, parallel processing, and the like.

In some embodiments, the plurality of modules 108 may be included within the memory 110. The memory 110 may further include a system database 112 to store data. The plurality of modules 108 may include a set of instructions that may be executed to cause the system 100 to perform any one or more of the methods/processes disclosed herein. The plurality of modules 108 may be configured to perform the steps of the present disclosure using the data stored in the system database 112 for identifying the user intent in the code-mixed utterance of the user, as discussed herein. In an embodiment, each of the plurality of modules 108 may be a hardware unit that may be outside the memory 110. Further, the memory 110 may include an operating system 114 for performing one or more tasks of the system 100, as performed by a generic operating system 114 in the communications domain. In one embodiment, the system database 112 may be configured to store the information as required by the plurality of modules 108 and the one or more processors/controllers 104 for identifying the user intent in the code-mixed utterance of the user.

In an embodiment of the present disclosure, at least one of the plurality of modules 108 may be implemented through the ML model. A function associated with the ML may be performed through the non-volatile memory, the volatile memory, and the one or more processors 104.

In an embodiment, the I/O interface 106 may enable input and output to and from the system 100 using suitable devices such as, but not limited to, a display, a keyboard, a mouse, a touch screen, a microphone, a speaker, and so forth.

Further, the present invention also contemplates a computer-readable medium that includes instructions or receives and executes instructions responsive to a propagated signal. Further, the instructions may be transmitted or received over the network via a communication port or interface or using a bus (not shown). The communication port or interface may be a part of the one or more processors/controllers 104 or may be a separate component. The communication port may be created in software or may be a physical connection in hardware. The communication port may be configured to connect with a network, external media, the display, or any other components in the electronic device 102, or combinations thereof. The connection with the network may be a physical connection, such as a wired Ethernet connection, or may be established wirelessly. Likewise, the additional connections with other components of the electronic device 102 may be physical or may be established wirelessly. The network may alternatively be directly connected to the bus. For the sake of brevity, the architecture and standard operations of the operating system 114, the memory 110, the system database 112, the one or more processors/controllers 104, and the I/O interface 106 are not discussed in detail.

FIG. 2 illustrates a block diagram of a plurality of modules 108 of the system 100 at an electronic device 102 for identifying the user intent in the code-mixed utterance of the user, according to an embodiment of the present disclosure. In an embodiment of the present disclosure, the plurality of modules 108 may include but is not limited to, a receiving module 202, a segmenting module 204, an obtaining module 206, a generating module 208, a translating module 210, and an identifying module 212. The plurality of modules 108 may be implemented by way of suitable hardware and/or software applications.

In an embodiment of the present disclosure, the receiving module 202 may be configured to receive the code-mixed utterance from the user for performing one or more actions via a chatbot. In an embodiment of the present disclosure, the code-mixed utterance corresponds to one or more commands provided by the user to the chatbot in two or more source languages. For example, one or more actions to be performed via the chatbot may be providing weather updates, offering technical support, ordering food delivery, and the like in response to the reception of the code-mixed utterance from the user.

Further, the segmenting module 204 may be configured to segment the received code-mixed utterance into a set of tokens by using an Artificial Intelligence (AI)-based Language Translator Network (LTN). In an embodiment of the present disclosure, the set of tokens correspond to individual words or terms that make up a sentence or text.

Furthermore, the obtaining module 206 may be configured to obtain contextual information and contextual representations associated with the received code-mixed utterance based on the set of tokens by using the AI-based LTN. In an embodiment of the present disclosure, the contextual information corresponds to the meaning of a current token from the set of tokens in relation to one or more surrounding tokens associated with the current token. Further, the contextual representations are associated with linguistic properties of the code-mixed utterances. In an exemplary embodiment of the present disclosure, the linguistic properties of the code-mixed utterances may be syntax, semantics, morphology, pragmatics, and the like. In obtaining the contextual information and the contextual representations, the obtaining module 206 may be configured to convert each token of the set of tokens into a fixed-dimensional vector by using the AI-based LTN. Further, the obtaining module 206 may be configured to determine the order of each token of the set of tokens in a sequence of the set of tokens based on the fixed-dimensional vector and positional information associated with each token of the set of tokens by using the AI-based LTN. In an embodiment of the present disclosure, positional information associated with each token refers to the knowledge of the specific location or position of a token within the set of tokens. Further, the obtaining module 206 may be configured to determine the contextual information and the contextual representations associated with the received code-mixed utterance based on the fixed-dimensional vector and the determined order of each token of the set of tokens.

Further, the generating module 208 may be configured to generate the fixed dimensional representation for each token of the set of tokens based on the obtained contextual information and the obtained contextual representations by using the AI-based LTN. In generating the fixed dimensional representation for each token, the generating module 208 may be configured to obtain contextual dependencies between each token of the set of tokens based on the obtained contextual information and the obtained contextual representations by using the AI-based LTN. In an embodiment of the present disclosure, the AI-based LTN generates vectors (embeddings) for each word depending on the other words in the sentence instead of having one vector per word. Thus, each word in the sentence becomes contextually dependent on other words in the sentence. Further, the generating module 208 may be configured to refine the obtained contextual information and the obtained contextual representations based on the obtained contextual dependencies by using a feedforward network. The generating module 208 may be configured to identify relevant information in the refined contextual information and the refined contextual representations by using an AI-based attention mechanism. Also, the generating module 208 may be configured to generate the fixed dimensional representation for each token of the set of tokens based on the identified relevant information by using the AI-based LTN.

Further, the generating module 208 may be configured to generate a set of vocabulary probabilities for the fixed dimensional representation associated with each token of the set of tokens by using the AI-based LTN. In an embodiment of the present disclosure, each vocabulary probability of the set of vocabulary probabilities corresponds to probabilities associated with the vocabulary of a target language. In an embodiment of the present disclosure, vocabulary probability is the relative importance of each token in a sentence or a set of tokens. Each word in a sentence is represented as a probability distribution. The probability distribution represents how much 'attention' is required to be given to each word while encoding a current word. This probability distribution is then used to create a weighted sum of the vectors, which is weighted based on how much attention is required to be given to each word by an AI model. In an embodiment of the present disclosure, the fixed-dimensional representation refers to a vector or a fixed-sized numerical representation that captures the information and characteristics of a decoder output. When the decoder generates an output, such as a translated word or a target language token, it goes through an attention mechanism that considers the context from an encoder and generates an attention-weighted representation. The attention-weighted representation summarizes the relevant information from the encoder and aids in generating the most appropriate translation or output. To further process this attention-weighted representation, it is embedded into a fixed-dimensional vector. The embedding process maps the representation into a continuous vector space of a predefined size. This fixed size ensures that the decoder output can be consistently represented and processed within the model. By converting the decoder output into the fixed-dimensional representation, it becomes easier for the AI-based LTN to manipulate and analyze the output in subsequent layers. The fixed dimensionality allows the AI-based LTN to apply operations, such as linear transformations or calculations, that require inputs of a consistent shape. After the fixed-dimensional representation is obtained, it is typically passed through a softmax layer. The softmax layer converts the representation into probabilities over the vocabulary of the target language. These probabilities indicate the likelihood of each target language word or token being the correct translation or output.

Furthermore, the translating module 210 may be configured to translate the code-mixed utterances to a translation text in the target language based on the generated set of vocabulary probabilities by using the AI-based LTN. In an exemplary embodiment of the present disclosure, the target language is one of the two or more source languages. The details on the operation of the AI-based LTN for translating the translation text in the target language have been explained with reference to at least FIGS. 3A and 3B.

In an embodiment of the present disclosure, the identifying module 212 may be configured to identify the user intent in the translation text by using an AI-based Intent Detection Network (IDN). In identifying the user intent in the translation text, the identifying module 212 may be configured to segment the translation text into a plurality of translation tokens by using the AI-based IDN. Further, the identifying module 212 may be configured to determine the user intent of the translation text based on the plurality of translation tokens by using the AI-based IDN. The identifying module 212 may be configured to identify one or more entities in the translation text by using the AI-based IDN upon determining the user intent. For example, the translation text is "I need to book a flight from New York to New Delhi", the one or more relevant entities associated with the translation text are book and flight. In another example, the translation text is "I need to book a flight from New York to New Delhi and I need to know the limit of the check-in-luggage", the one or more relevant entities associated with the translation text are the flight and the limit of the check-in-luggage.

Further, the identifying module 212 may be configured to convert the plurality of translation tokens and the translation text into a set of embeddings by using the AI-based IDN upon identifying the one or more entities. In an embodiment of the present disclosure, the set of embeddings represents a semantic meaning of the plurality of translation tokens and the one or more entities. Furthermore, the identifying module 212 may be configured to classify the user intent into one or more predefined intent categories based on the determined user intent and the set of embeddings by using the AI-based IDN. In an exemplary embodiment of the present disclosure, For example, in a flight booking chatbot, the AI-based IDN has predefined intents (predefined categories), such as book_flight, search-flight, and the like. The AI-based IDN extracts the information from the user's input text and categorizes the input to a corresponding intent.

Further, the identifying module 212 may be configured to extract one or more relevant entities from the translation text based on the determined user intent and the set of embeddings by using the AI-based IDN upon classifying the user intent. The identifying module 212 may be configured to identify the one or more actions to be executed by the chatbot based on the classified user intent and the extracted one or more relevant entities by using the AI-based IDN. The details on the operation of the AI-based IDN for identifying the user intent have been explained with reference to at least FIG. 4.

In identifying the one or more actions, the identifying module 212 may be configured to determine a dialogue state associated with the code-mixed utterance between the chatbot and the user based on the classified user intent and the extracted one or more relevant entities. In an embodiment of the present disclosure, the dialogue state includes one or more conversational parameters. The dialogue state refers to the information or context that is maintained during a conversation between the user and the conversational AI system. The dialogue state is continually updated as the conversation progresses, and it provides a snapshot of the current conversation context. Further, the dialogue state enables the conversational AI system to keep track of user requests, understand the user's intent, and provide relevant responses based on the collected context. In an embodiment of the present disclosure, the dialogue state tracking is a critical aspect of dialogue management. It involves techniques that update and maintain the dialogue state based on user inputs and system actions. The dialogue state serves as a foundation for decision-making by policies, as it provides the necessary context for selecting the next appropriate action or response. In an exemplary embodiment of the present disclosure, the one or more conversational parameters include the user intent, entity values, system actions, and any other relevant information that helps in understanding the ongoing conversation. For example, if the user intends to book a flight and the entity is from New York, the chatbot takes action and starts the process of booking the flight. In another example, in a restaurant reservation system, the dialogue state may include information like the user's preferred cuisine, party size, date, and time. This information is essential for the system 100 to understand and fulfill the user's reservation request accurately. Further, the identifying module 212 may be configured to determine one or more policies based on the determined dialogue state. In an embodiment of the present disclosure, the one or more policies are components or decision-making mechanisms that determine the next action or response of a conversational AI system based on the current dialogue state. The one or more policies guide the conversation flow and decide how the system 100 should respond to user inputs. In an exemplary embodiment of the present disclosure, the one or more policies include rule-based policies, retrieval-based policies, machine learning-based policies, and the like. The selection of policies depends on the complexity of the conversational AI system, the available data, and the desired level of customization. By selecting appropriate policies, the system 100 can generate contextually relevant and meaningful responses, improving the overall conversational experience. Further, the identifying module 212 may be configured to identify the one or more actions to be executed by the chatbot based on the determined one or more policies and the one or more conversational parameters. Furthermore, the identifying module 212 may be configured to update the one or more policies based on the identified one or more actions and the one or more conversational parameters.

In an embodiment of the present disclosure, the obtaining module 206 may be configured to receive a source language text and a set of target language labels. The source language text is the training data required for the AI-based LTN. In an embodiment of the present disclosure, a set of sentences in the source language/languages and its translation to the target language comprise the training data. Further, one or more sentences in the source language is the "source language text. In an embodiment of the present disclosure, the set of target language labels are translations of the source language text in the target language. Further, the obtaining module 206 may be configured to segment the source language text into a plurality of source tokens. The obtaining module 206 may be configured to transform each of a set of input sequences associated with the received source language text into a fixed sequence length upon segmenting the source language text. The obtaining module 206 may be configured to generate a set of positional encodings and a set of word embeddings for the source language text and the set of target language labels upon transforming each token of the set of input sequences. In an embodiment of the present disclosure, after the source language text is divided into the set of source tokens, the set of input sequences i.e., sequence of tokens are then converted to vectors which are used for generating the contextual understanding of the tokens. In an embodiment of the present disclosure, the tokens that are generated from the source language text are converted into fixed-dimensional vectors (word embeddings) and combined with positional information (positional encodings) to capture their order in the sequence. Furthermore, the obtaining module 206 may be configured to translate the source language text into the target language based on the generated set of positional encodings and the generated set of word embeddings. The obtaining module 206 may be configured to optimize a set of hyper-parameters associated with the AI-based LTN upon translating the source language text into the target language. Further, the obtaining module 206 may be configured to update the weight of the AI-based LTN upon optimizing the set of hyper-parameters. The obtaining module 206 may be configured to obtain a trained AI-based LTN model upon updating the weight of the AI-based LTN. The details on the training of AI-based LTN and the AI-based IDN have been explained with reference to at least FIG. 5.

In an embodiment of the present disclosure, the AI-based LTN and the AI-based IDN (i.e., Large Language Model (LLM)-based language translation models) are fine-tuned. Further, fine-tuning the LLM-based language translation models is a technique that involves adapting pre-trained models specifically designed for language translation tasks. This approach is used in the field of machine translation due to its ability to achieve state-of-the-art performance and generalize across various language pairs. The process begins with pre-training the LLM-based language translation models on large-scale multilingual corpora, allowing them to learn linguistic patterns, syntactic structures, and semantic relationships. This pre-training phase equips the models with a deep understanding of language and improves their translation capabilities. To make these LLM-based language translation models task-specific, fine-tuning is performed. Task-specific labeled data, comprising sentence pairs in the source and target languages, is used to further train the LLM-based language translation models. This fine-tuning process adapts the pre-trained models to specific language pairs, enabling them to capture the idiosyncrasies and nuances of translation in the target domain. Fine-tuning LLM-based language translation models offer numerous advantages. For example, it reduces the need for extensive handcrafted linguistic rules and features, as the models can automatically learn translation patterns through fine-tuning. This approach also speeds up development by leveraging pre-trained models, saving time and computational resources compared to training from scratch. However, fine-tuning LLM-based language translation models also pose challenges. The availability of large-scale labeled data for specific language pairs is crucial for optimal performance. Additionally, careful consideration is required to address potential biases in the pre-training data and mitigate fairness concerns in translation outputs. By combining pre-training knowledge with task-specific training, fine-tuning enables rapid development of high-performance translation models, advancing the capabilities of AI in multilingual communication and facilitating accurate and efficient language translation. The details of the operation of the system 100 have been explained with reference to at least FIG. 6.

Figure 3A:
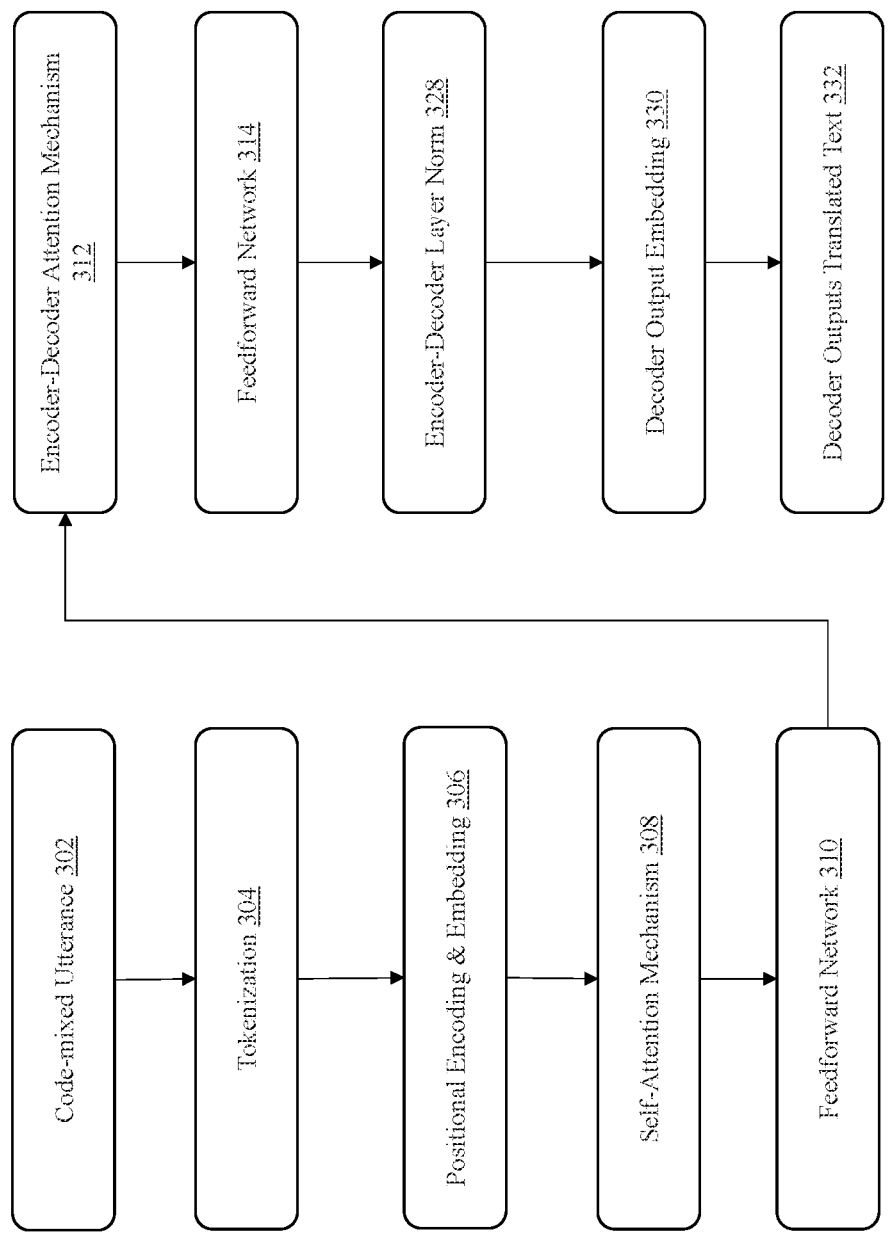
FIG. 3A illustrates a block diagram of an operation of an Artificial Intelligence (AI)-based Language Translator Network (LTN) for translating the code-mixed utterances to a translation text, according to an embodiment of the present disclosure.
Figure 3B:
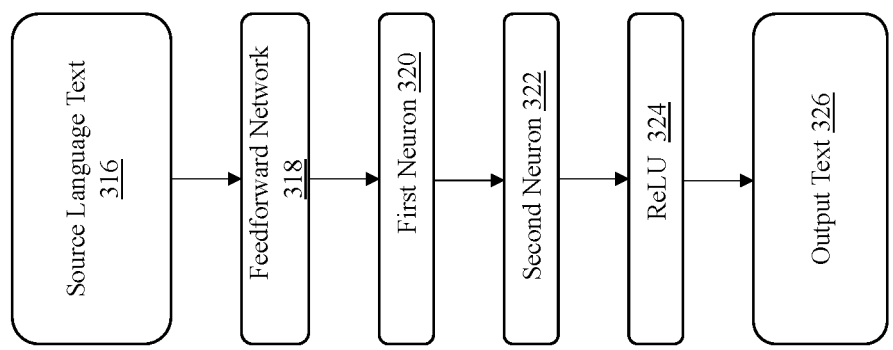
FIG. 3B illustrates a block diagram of an operation of a feedforward network, according to an embodiment of the present disclosure.

FIG. 3A illustrates a block diagram of an operation of the AI-based LTN for translating the code-mixed utterances to a translation text, according to an embodiment of the present disclosure. FIG. 3B illustrates a block diagram of an operation of a feedforward network, according to an embodiment of the present disclosure. For the sake of brevity, FIGS.

3A-3B are explained together. As explained with reference to at least FIGS. 1 and 2, the AI-based LTN is trained to translate the code-mixed utterances to the translation text in the target language based on the set of vocabulary probabilities.

At step 302, the system 100 receives the code-mixed utterance (input text) from the user for performing the one or more actions via a chatbot. Further, at step 304, the system 100 segments the received code-mixed utterance text into the set of tokens or a set of smaller units, such as words or sub-words, to be processed by the AI-based LTN. At step 306, positional encoding and embedding is performed. In positional encoding and embedding, the set of tokens are converted into fixed-dimensional vectors and combined with the positional information to capture their order in the sequence. In an embodiment of the present disclosure, the AI-based LTN includes both an encoder and a decoder component. The encoder processes the code-mixed utterance, while the decoder generates the translated text. The encoder takes the tokenized and embedded input text and applies a series of encoder layers to capture contextual information and representations. In an embodiment of the present disclosure, the term "embedded input text" is used in reference to the process of converting the tokenized input text into fixed-dimensional vectors or embeddings. Each token in the translated text is represented by a vector that captures its semantic and contextual information. The embedding process aims to map each token to a continuous vector space, where similar tokens or words are closer together in the vector space. This enables the AI-based LTN to capture relationships and similarities between words, which helps in understanding the meaning of the input text. There are various methods to perform word embeddings, such as Word2Vec, GloVe, or more advanced techniques like contextual word embeddings (e.g., Bidirectional Encoder Representations from Transformers (BERT) or Generative Pre-trained Transformers (GPT)). These methods use neural networks to learn word representations based on the context in which they appear in a large corpus of text. The embedding models are trained to generate meaningful representations that capture semantic relationships between words.

At step 308, each encoder layer includes self-attention mechanisms to attend to different parts of an input sequence associated with the received code-mixed utterance and capture dependencies between the set of tokens. Furthermore, at step 310, after the self-attention mechanism, the feedforward network is applied to further process the representations.

Further, at step 312, the encoder representations are used by the decoder through an encoder-decoder attention mechanism to focus on relevant information during the translation process. At step 314, the feedforward network is again used to further process the relevant information, as shown in FIG. 3B. In an embodiment of the present disclosure, the feedforward network is a kind of Deep Neural Network (DNN). The feedforward network is a fundamental component in many deep learning architectures, including transformer-based models. It is responsible for processing the representations obtained from the self-attention mechanism to further refine and transform the information. The feedforward network includes multiple layers of interconnected neurons or units. Each neuron performs a weighted sum of its inputs, applies an activation function to the sum, and produces an output. The output of each neuron serves as an input to the neurons in the next layer. For example, to illustrate the feedforward network in the context of a transformer-based language translator, an input sequence in the source language text 316 represented by the vector is [0.3, −0.1, 0.8, 0.5]. After the self-attention mechanism in the transformer's encoder layer, the contextual representations are obtained for each token: [0.2, −0.3, 0.5, 0.6]. These contextual representations capture the contextual information for each token in the input sequence. In an embodiment of the present disclosure, the contextual information refers to the understanding of the current token or word in relation to its surrounding tokens or words. The contextual information considers the local context within the input sequence to capture dependencies, relationships, and meaning. For example, in the sentence "I ate an apple," the word "ate" is semantically related to the word "apple," and the encoder should capture this contextual information. In an embodiment of the present disclosure, the contextual representations correspond to vector-based representations that encode the meaning and characteristics of the input text. These contextual representations aim to capture semantic information, syntactic structures, and other linguistic properties of the input text. The encoder layers transform the input tokens and their contextual information into higher-level representations that the model can use for further processing. The encoder layers in a transformer model typically consist of mechanisms such as self-attention and feedforward neural networks. These mechanisms allow the model to attend to different parts of the input sequence, focus on relevant tokens, and capture dependencies between words. By applying multiple encoder layers, the AI-based LTN can progressively refine and enhance its understanding of the input text, capturing more nuanced contextual information and generating higher-level representations Further, the feedforward network 318 is then applied to further process these contextual representations. For example, the feedforward network 318 includes a single hidden layer with two neurons. The weights and biases of the feedforward network 318 are learned during the training phase. The first neuron 320 in the hidden layer performs the following computation: neuron_1=activation (w1*representation+b1). Similarly, the second neuron 322 in the hidden layer performs its computation: neuron_2=activation (w2*representation+b2). Here, 'w1' and 'w2' represent the weights connecting the representations to the neurons, and 'b1' and 'b2' are the biases of the neurons. The activation function applies a non-linear transformation to the weighted sum to introduce non-linearity into the AI-based LTN. Further, common activation functions include Rectified Linear Unit (ReLU) 324, sigmoid, or tanh. The outputs of the neurons in the hidden layer serve as inputs to the next layer or, in this case, the output layer. The output layer may perform additional computations, such as weighted sum and activation, depending on the specific task or model architecture. The final output text 326 of the feedforward network 318 may be, for example [0.1, 0.4]. These values represent the processed and transformed representations obtained from the feedforward network 318. They can be used as inputs to subsequent layers or further processed to generate the translated text in a transformer-based language translator.

Further, at step 328, an encoder-decoder layer norm is applied after each encoder and decoder layer in the transformer model. The encoder-decoder layer norm ensures consistent scaling and distribution of inputs to each layer, promoting stable and effective training. For example, the decoder part of the transformer model is required to translate the input text from English to Spanish. The encoder-decoder layer norm is applied to the inputs of the decoder layers. Further, the encoder-decoder layer norm normalizes the inputs, ensuring that they have a consistent scale and distribution across different layers. By applying layer normalization, the encoder-decoder layer norm helps stabilize and improve the training process. The encoder-decoder layer norm mitigates the vanishing gradient problem, facilitates better gradient propagation, and promotes stable learning by reducing internal covariate shifts. At step 330, a decoder output embedding is obtained. In the decoder output embedding, the output of the attention mechanism is embedded to obtain a fixed-dimensional representation. The embedded decoder output is passed through a softmax layer, which converts the output into probabilities over the vocabulary of the target language. At step 332, the decoder outputs the translated text.

Figure 4:
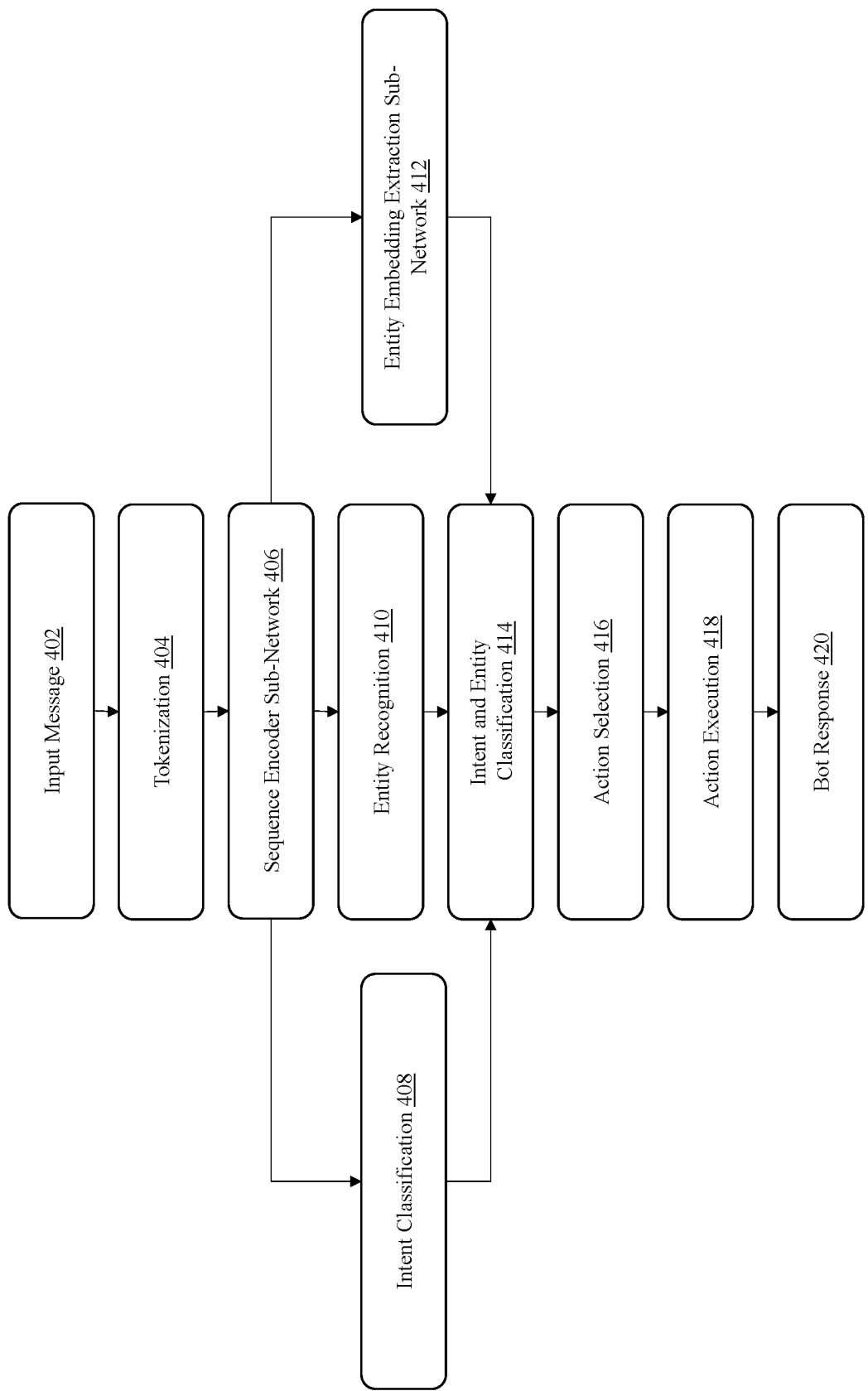
FIG. 4 illustrates a block diagram depicting an operation of an AI-based Intent Detection Network (IDN) for identifying user intent, according to an embodiment of the present disclosure.

FIG. 4 illustrates a block diagram depicting an operation of the AI-based IDN for identifying the user intent, according to an embodiment of the present disclosure. As explained with reference to at least FIGS. 1 and 2, the AI-based IDN is trained to identify the user intent in the translation text.

At step 402, the system 100 receives the code-mixed utterance (input message or query provided by the user). Further, at step 404, the system 100 performs the tokenization i.e., the input message is split into individual tokens or words to prepare it for further processing. At step 406, a sequence encoder sub-network in a transformer-based language translator captures the contextual information from the input message, such as word dependencies and relationships. The sequence encoder sub-network generates representations that encode this information. For example, the English sentence "I love cats" is required to be translated into Spanish. The sequence encoder sub-network takes the tokenized and embedded English input sentence as input. Each encoder layer in the sequence encoder sub-network processes the input sequence and captures the contextual information and dependencies between words. In this case, the sequence encoder sub-network may analyze the English sentence and analyze the words like "love" and "cats" to understand their context within the sentence. The sequence encoder sub-network captures information about word order, semantics, and dependencies which create rich representations of the input sequence that encode this contextual information.

Further, at step 408, the system 100 performs intent classification to determine the intent or purpose behind the user's message, such as "book a flight" or "get weather information". At step 410, the system 100 performs an entity recognition operation. In the entity recognition operation, entities present in the user's message, such as names, dates, or locations, are identified. For example, in the message "book a flight from New York to London," the entities are "New York" (departure location) and "London" (destination). Further, at step 412, an entity embedding extraction sub-network is used to perform an entity extraction operation. In the entity extraction operation, the input message and entity tokens are converted into numerical representations called embeddings. These embeddings capture the semantic meaning of the words and entities, allowing the model to understand the context of the input message. In an embodiment of the present disclosure, a Dual Intent and Entity Transformer (DIET) classifier combines the intent and entity embeddings to jointly classify the intent and extract the relevant entities from the user's message. The DIET classifier uses a transformer-based neural network architecture to make these predictions.

Furthermore, at step 414, an intent and entity classification operation is performed. In the intent and entity classification operation, the DIET classifier outputs the predicted intent and the extracted entities from the user's message. At step 416, an action selection operation is performed. In the action selection operation, the RASA framework selects the appropriate action or response to be taken by the chatbot based on the predicted intent and entities. At step 418, the selected action is executed, which may involve interacting with external Application Programming Interfaces (APIs) or performing specific tasks. At step 420, the chatbot generates a response based on the executed action and sends the response back to the user.

Figure 5:
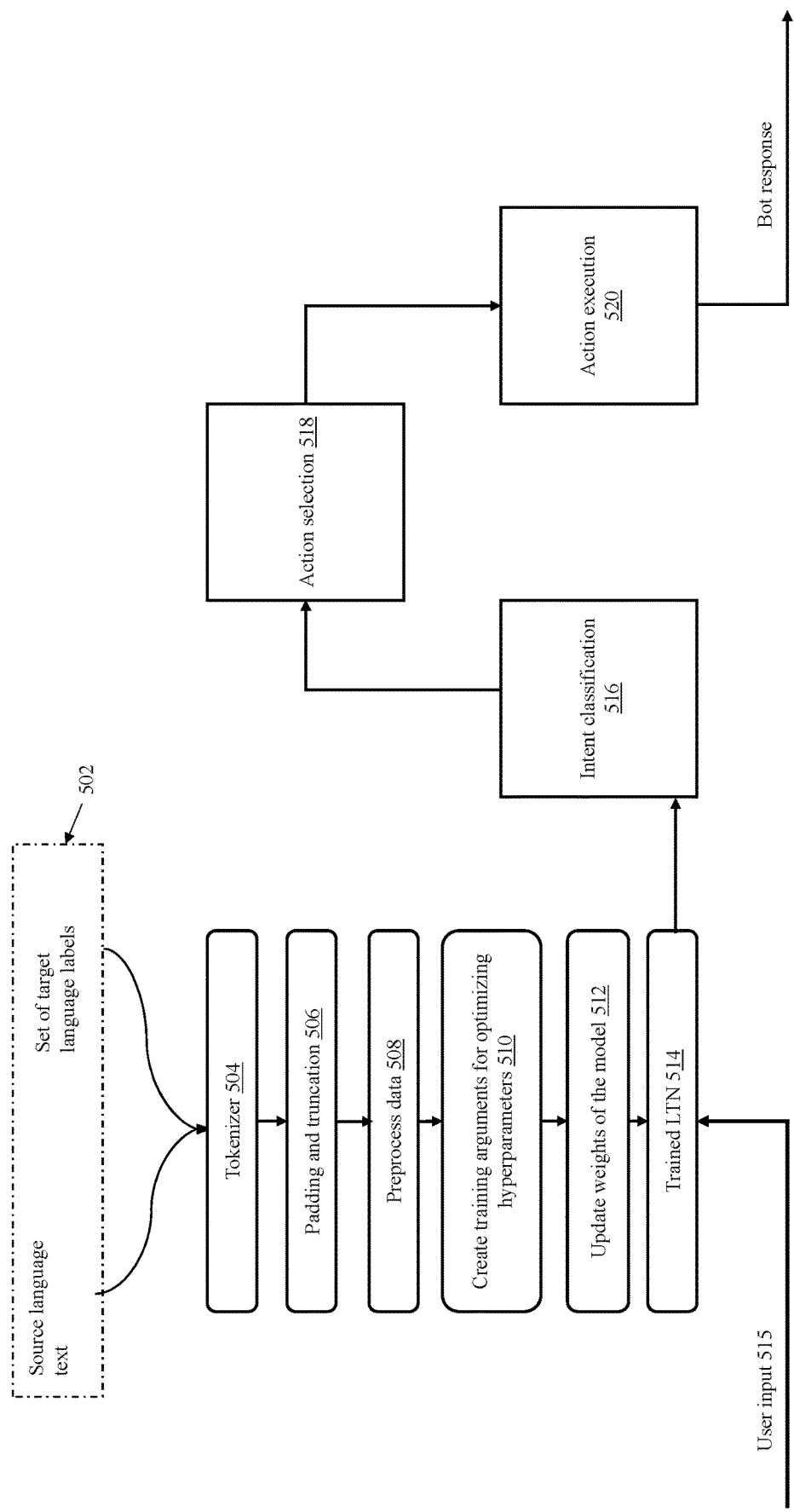
FIG. 5 illustrates a block diagram depicting a process of training the AI-based LTN and AI-based IDN, according to an embodiment of the present disclosure.

FIG. 5 illustrates a block diagram depicting a process of training the AI-based LTN and AI-based IDN, according to an embodiment of the present disclosure. As explained with reference to at least FIGS. 1 and 2, the AI-based IDN is trained to identify the user intent in the translation text.

FIG. 5 shows the steps involved in fine-tuning of the AI-based LTN with relevant data. At step 502, the system 100 receives the source language text and the set of target language labels. In an embodiment of the present disclosure, the source language text and the set of target language labels is prepared by the system 100. The source language text and the set of target language labels represent the training data required for training the AI-based LTN. At step 504, a tokenizer segments the source language text into the plurality of source tokens, such that the AI-based LTN can process the text. At step 506, padding and truncation are performed. In an embodiment of the present disclosure, the source language text should have a defined size, so that the padding and truncation are done during pre-processing the training data. In an embodiment of the present disclosure, the padding involves adding special tokens or symbols to the input sequences to make them all of equal length. In the case of language translation, padding is typically added to shorter sentences or sequences to match the length of the longest sequence in the training data. This ensures that the AI-based LTN can process the sequences in parallel efficiently. The added padding tokens usually have no meaning and are ignored during the model's processing. In an embodiment of the present disclosure, the truncation involves cutting off or removing tokens from sequences that exceed a predefined maximum length. If the original text or sentence is longer than the specified maximum length, it is truncated by removing tokens from the end until it fits within the limit. This helps to ensure that the input sequences do not become too long, which could negatively impact the model's performance or memory usage. Both padding and truncation are common techniques used to create batches of input sequences with consistent lengths during training. By applying these techniques, all sequences within a batch have the same length, making it easier to process them in parallel and feed them into the transformer model efficiently. In an embodiment of the present disclosure, the choice of maximum length for padding and truncation may be determined based on the specific requirements of the model and the dataset being used. Thus, it is important to balance between keeping sufficient context within the sequences and maintaining computational efficiency. For example, if the maximum length is set to 100 tokens, all input sequences may be padded with special tokens or truncated to 100 tokens, resulting in a fixed-length representation. Having fixed-length representations simplifies the architecture and operations within the model, as it ensures consistent shapes for all input sequences and allows for efficient batching and computation.

At step 508, the training data is pre-processed. In pre-processing the training data, the training data is processed to generate the positional encoding and the word embeddings, such that the AI-based LTN understands the features and the set of target language labels. For example, the "source language text" refers to the English sentences, which act as the input for the AI-based LTN. The "target language labels" represent the corresponding French translations, which act as the desired output or target for the AI-based LTN to learn from. Accordingly, the set of target language labels may correspond to the desired or expected translations of the input sentences. The set of target language labels may serve as a reference for the translator to understand how to convert the source language text accurately.

In an embodiment of the present disclosure, the AI-based LTN is trained using a transformer trainer class. The source language text is processed through the encoder-attention-decoder layers, such that the text in the target language is generated. At step 510, training arguments are created for optimizing hyperparameters. In step 510, training arguments for optimizing hyperparameters are created. Further, the parameters like epoch and learning rate are optimized so that the training loss is minimized.

Further, at step 512, the weights of the AI-based LTN are updated. Further, the trained AI-based LTN is obtained at step 514. In an embodiment of the present disclosure, the evaluation data is used for calculating the accuracy of the prediction of the intent category. In an embodiment of the present disclosure, the AI-based LTN receives a user input (user utterance) 514 and generates the user utterance in the base language, and then the AI-based IDN processes the data for intent classification 516 and action selection 518. In the intent classification, the AI-based IDN outputs the predicted intent from the user's message which is translated to the base language by the AI-based LTN. In the action selection, system 100 selects the appropriate action or response to be taken by the chatbot based on the predicted intent. At step 520, the action execution is performed. In the action execution, the selected action is executed, which may involve interacting with external APIs or performing specific tasks. Further, the chatbot generates a response based on the executed action and sends the generated response back to the user.

In an embodiment of the present disclosure, a large corpus of text data is used to pre-train Large Language Models (LLMs), such as BERT or GPT. These LLMs learn contextual representations of words and sentences by employing deep neural network architectures. The pre-training process involves tasks like masked language modeling or next-sentence prediction, which enable the models to capture intricate language patterns and semantic relationships. To adapt the pre-trained language models to the specific domain of the chatbot, mixed languages domain adaptation training is performed. Domain-specific training data comprising labeled examples of user inputs and their corresponding intents is utilized. The data used in training the LTN may be obtained from the books and online documents by the bi-lingual community. The evaluation of the model may done using Bi-Lingual Evaluation Understudy (BLEU) score and by user feedback. The mix language domain adaptation training process involves updating the model's parameters using the domain-specific data while retaining the knowledge acquired during pre-training. Once the language models have been mixed language domain adaptation trained on the domain-specific data, the language models are ready for code-mixed language translation. During inference, a user's input is tokenized into words or sub-word units, and these tokens are passed through the trained model. The model generates contextualized representations for each token, which are then aggregated to obtain a fixed-length representation of the input. This representation is fed into a classifier, such as a feed-forward neural network to predict the intent category. By leveraging mixed language domain adaptation training with pre-trained models, the system 100 addresses the challenge of limited training data, resulting in enhanced performance and generalization capabilities. The pre-trained models capture rich semantic and contextual information, leading to an improved understanding of user intents. Additionally, the mixed language domain adaptation training process enables customization to domain-specific data, further enhancing the accuracy of the intent classification. The output is further transferred to the AI-based IDN of the pipeline to detect the user utterance to a specific category of intent. These two networks i.e., AI-based LTN and the AI-based IDN, are trained separately before incorporating them into the pipeline so that it is less complex to train each network depending on the requirement.

Figure 6:
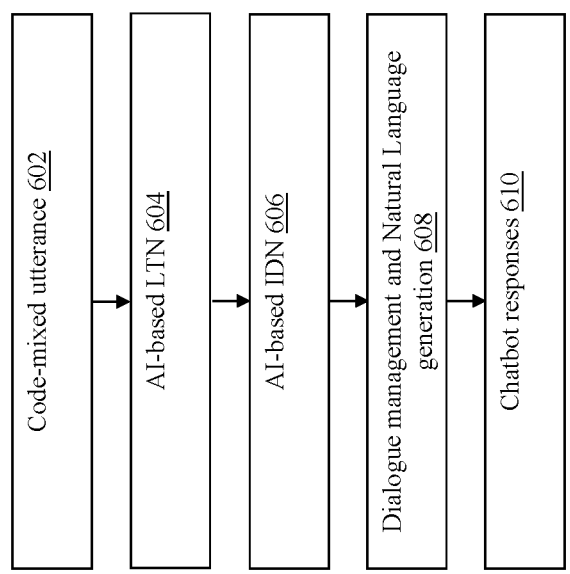
FIG. 6 illustrates a block diagram depicting an operation of the system for identifying the user intent in the code-mixed utterance of the user, according to an embodiment of the present disclosure.

FIG. 6 illustrates a block diagram depicting an operation of the system 100 for identifying the user intent in the code-mixed utterance of the user, according to an embodiment of the present disclosure. As explained with reference to at least FIGS. 1 and 2, the system 100 for identifying the user intent in the code-mixed utterance of the user.

As depicted in FIG. 6, the system 100 receives the code-mixed utterance from the user for performing the one or more actions via the chatbot, at step 602.

At step 604, the AI-based LTN translates the code-mixed utterances to the translation text in the target language.

At step 606, the AI-based IDN identifies the user intent in the translation text.

At step 608, the dialogue management is performed. Also, a natural language generation operation is performed in the target language. In an embodiment of the present disclosure, dialogue management plays an important role in conversational AI systems, encompassing the management of conversational flow and decision-making for appropriate responses. The dialogue management involves understanding user intents, tracking conversation states, and generating contextually relevant replies. In an embodiment of the present disclosure, the user intends identify user goals or the one or more actions required to be executed by the chatbot, while dialogue state tracking maintains the conversation context. Also, policies determine the next action based on the dialogue state, and actions represent the chatbot responses 610. The conversational AI systems utilize dialogue management to process user inputs, update dialogue states, select actions, and generate chatbot responses 610. By leveraging techniques, such as intent classification, entity extraction, and policy selection, conversational AI systems can handle complex conversations, maintain context, and deliver engaging interactions. The workflow includes processing user inputs, updating dialogue states, selecting policies, executing actions, generating chatbot responses 610, and continuing the conversation. In an embodiment of the present disclosure, dialogue management empowers conversational AI systems to understand user intent, track dialogue flow, and provide meaningful and interactive conversational experiences.

Figure 7:
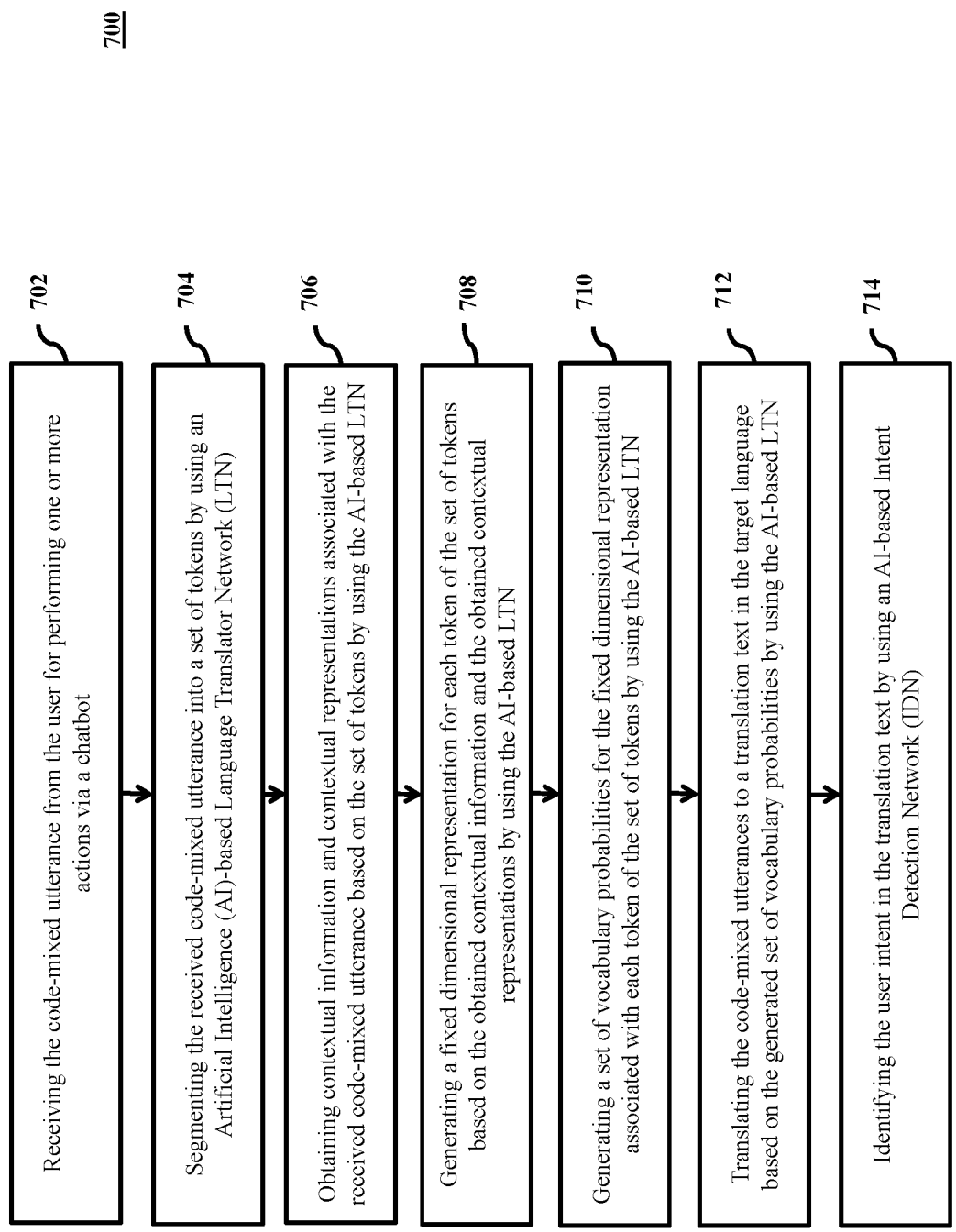
FIG. 7 illustrates an exemplary process flow depicting a method for identifying the user intent in the code-mixed utterance of the user, according to another embodiment of the present disclosure.

FIG. 7 illustrates an exemplary process flow depicting a method for identifying a user intent in a code-mixed utterance of a user, according to another embodiment of the present disclosure. The method 700 may be performed by a system 100 implemented in the electronic device 102, as shown in FIGS. 1 and 2.

At step 702, the method 700 includes receiving the code-mixed utterance from the user for performing one or more actions via a chatbot. In an embodiment of the present disclosure, the code-mixed utterance corresponds to one or more commands provided by the user to the chatbot in two or more source languages.

At step 704, the method 700 includes segmenting the received code-mixed utterance into a set of tokens by using an Artificial Intelligence (AI)-based Language Translator Network (LTN).

At step 706, the method 700 includes obtaining contextual information and contextual representations associated with the received code-mixed utterance based on the set of tokens by using the AI-based LTN. In obtaining the contextual information and the contextual representations, the method 700 includes converting each token of the set of tokens into a fixed-dimensional vector by using the AI-based LTN. Further, the method 700 includes determining the order of each token of the set of tokens in a sequence of the set of tokens based on the fixed-dimensional vector and positional information associated with each token of the set of tokens by using the AI-based LTN. The method 700 also includes determining the contextual information and the contextual representations associated with the received code-mixed utterance based on the fixed-dimensional vector and the determined order of each token of the set of tokens. In an embodiment of the present disclosure, the contextual information corresponds to the meaning of a current token from the set of tokens in relation to one or more surrounding tokens associated with the current token. The contextual representations are associated with linguistic properties of the code-mixed utterances.

Further, at step 708, the method 700 includes generating a fixed dimensional representation for each token of the set of tokens based on the obtained contextual information and the obtained contextual representations by using the AI-based LTN. In generating the fixed dimensional representation for each token of the set of tokens, the method 700 includes obtaining contextual dependencies between each token of the set of tokens based on the obtained contextual information and the obtained contextual representations by using the AI-based LTN. Further, the method 700 includes obtaining contextual dependencies between each token of the set of tokens based on the obtained contextual information and the obtained contextual representations by using the AI-based LTN. The method 700 also includes refining the obtained contextual information and the obtained contextual representations based on the obtained contextual dependencies by using a feedforward network. Furthermore, the method 700 includes refining the obtained contextual information and the obtained contextual representations based on the obtained contextual dependencies by using a feedforward network. Also, the method 700 includes identifying relevant information in the refined contextual information and the refined contextual representations by using an AI-based attention mechanism. The method 700 includes generating the fixed dimensional representation for each token of the set of tokens based on the identified relevant information by using the AI-based LTN.

At step 710, the method 700 includes generating a set of vocabulary probabilities for the fixed dimensional representation associated with each token of the set of tokens by using the AI-based LTN. In an embodiment of the present disclosure, each vocabulary probability of the set of vocabulary probabilities corresponds to probabilities associated with the vocabulary of a target language.

At step 712, the method 700 includes translating the code-mixed utterances to a translation text in the target language based on the generated set of vocabulary probabilities by using the AI-based LTN. In an embodiment of the present disclosure, the target language is one of the two or more source languages.

At step 714, the method 700 includes identifying the user intent in the translation text by using an AI-based Intent Detection Network (IDN). In identifying the user intent in the translation text, the method 700 includes segmenting the translation text into a plurality of translation tokens by using the AI-based IDN. Further, the method 700 includes determining the user intent of the translation text based on the plurality of translation tokens by using the AI-based IDN. The method 700 includes identifying one or more entities in the translation text by using the AI-based IDN upon determining the user intent. The method 700 also includes converting the plurality of translation tokens and the translation text into a set of embeddings by using the AI-based IDN upon identifying the one or more entities. In an embodiment of the present disclosure, the set of embeddings represent a semantic meaning of the plurality of translation tokens and the one or more entities. Furthermore, the method 700 includes classifying the user intent into one or more predefined intent categories based on the determined user intent and the set of embeddings by using the AI-based IDN.

Further, the method 700 includes extracting one or more relevant entities from the translation text based on the determined user intent and the set of embeddings by using the AI-based IDN upon classifying the user intent. Also, the method 700 includes identifying the one or more actions to be executed by the chatbot based on the classified user intent and the extracted one or more relevant entities by using the AI-based IDN.

Further, in identifying the one or more actions, the method 700 includes determining a dialogue state associated with the code-mixed utterance between the chatbot and the user based on the classified user intent and the extracted one or more relevant entities. In an embodiment of the present disclosure, the dialogue state includes one or more conversational parameters. In an exemplary embodiment of the present disclosure, the one or more conversational parameters include the user intent, entity values, system actions, and the like. The method 700 includes determining one or more policies based on the determined dialogue state. In an embodiment of the present disclosure, the one or more policies include rule-based policies, retrieval-based policies, machine learning-based policies, and the like. The method 700 also includes identifying the one or more actions to be executed by the chatbot based on the determined one or more policies and the one or more conversational parameters. Furthermore, the method 700 includes updating the one or more policies based on the identified one or more actions and the one or more conversational parameters.

Further, the method 700 includes receiving a source language text and a set of target language labels. In an embodiment of the present disclosure, the set of target language labels are translations of the source language text in the target language. The method 700 includes segmenting the source language text into a plurality of source tokens. Further, the method 700 includes transforming each of a set of input sequences associated with the received source language text into a fixed sequence length upon segmenting the source language text. The method 700 includes generating a set of positional encodings and a set of word embeddings for the source language text and the set of target language labels upon transforming each token of the set of input sequences. Furthermore, the method 700 includes translating the source language text into the target language based on the generated set of positional encodings and the generated set of word embeddings. The method 700 includes optimizing a set of hyper-parameters associated with the AI-based LTN upon translating the source language text into the target language. The method 700 also includes updating a weight of the AI-based LTN upon optimizing the set of hyper-parameters. Further, the method 700 includes obtaining a trained AI-based LTN model upon updating the weight of the AI-based LTN.

While the above steps shown in FIG. 7 are described in a particular sequence, the steps may occur in variations to the sequence in accordance with various embodiments of the present disclosure. Further, the details related to various steps of FIG. 7, which are already covered in the description related to FIGS. 1-6 are not discussed again in detail here for the sake of brevity.

The present disclosure provides for various technical advancements based on the key features discussed above. The present disclosure discloses a method for training a conversational agent (chatbot) to recognize the code-mixed chat utterance with mixed-language intent related text. The present disclosure provides a user-utterance data collection pertaining to a specific Base Language (BL) (i.e., a primary or reference language when dealing with multilingual natural language processing tasks) and a mix of specific languages (i.e., mix BL or the code-mixed utterance) wherein the Language Identification Tags (LID) are not required. The LID are standardized codes or labels used to represent specific languages, dialects, or language varieties in various contexts, including linguistics, computer programming, and internationalization. Further, the present disclosure creates the AI-based LTN to generate BL specific user-intent utterances. The present disclosure creates the AI-based IDN to extract user-intents from the BL or MixBL texts. The present disclosure selects parameters associated with the AI-based LTN to accurately translate the code-mixed user utterance to BL. Furthermore, the present disclosure creates the AI-based IDN for identifying user-intents from only BL or MixBL texts. The present disclosure trains this end-to-end pipeline of custom build AI-based LTN with custom built AI-based IDN over required iterations with pruned network parameters to obtain a desired performance optimized for accuracy and speed. Also, in order to speed up the training, testing and implementation of such a mixed language goal oriented chatbot, the requirement of specific language experts (domain experts) is crucial, but availability of such experts is scarce. The present disclosure facilitates alleviation of this bottleneck and scales up the same chatbot to work on the BL domain and work equally efficiently across multiple-single language domains and multiple code-mixed language domains.

Further, the present disclosure takes an advantage of a pipeline built on individual custom-built modules i.e., the AI-based LTN and the AI-based IDN. The training datasets to each of these networks is different and independent of each other. The AI-based LTN and AI-based IDN are further trained together (referred to as pipeline training henceforth) end-to-end for creating a unique network that takes a mixed-language input and identifies application specific user-intents. The data required for the AI-based LTN may also be generated using publicly available translators. The LTN training process incorporates the information associated with the code-mixed utterance into the AI-based IDN, such that the AI-based IDN may be comprehended. The AI-based IDN allows a development teams to formulate its training data in the language of their choice so as to accurately translate the business processes into chatbot specific intents.

Further, the pipeline of the training process empowers the development teams to increase the number of languages by changing the AI-based LTN while keeping the IDN equally efficient as before. Also, the pipeline training process allows for increasing the variety and volume of intents by refreshing the AI-based IDN even without a requirement of changing the AI-based LTN. This allows for scaling the horizon of number of languages without a requirement to audit the performance of the AI-based LTN. In an embodiment of the present disclosure, a Deep Neural Network (DNN) model is custom-trained using MixBL text data.

In an embodiment of the present disclosure, Target Language Specific Domain Adaptation Training (TLSDAT) improves the speed of AI/ML development by enabling non-experts to leverage pre-trained models and adapt them to specific language domains. TLSDAT reduces training time by utilizing pre-trained models as a starting point, allowing developers to focus on fine-tuning rather than training from scratch. It also reduces data requirements by leveraging existing models trained on large datasets, enabling non-experts to achieve comparable performance with less labelled data. TLSDAT enhances model performance and generalization by leveraging learned representations and features, accelerating deployment in real-world scenarios. This accessibility to non-experts democratizes AI/ML development, allowing them to leverage state-of-the-art models and techniques without requiring extensive expertise. Further, the TLSDAT empowers non-experts to quickly adopt and implement AI solutions, driving faster adoption and implementation across various domains and industries. By bridging the gap between experts and non-experts, the TLSDAT facilitates rapid development and implementation of effective AI/ML solutions.

Furthermore, an intent specific LTN model (AI-based LTN) is created to generate BL specific user utterances. The AI-based LTN works in such a way that the user utterance in MixBL, BL and the secondary language are transferred to the AI-based IDN so that the AI-based IDN can work in BL. The training data for AI-based LTN is generated from publicly available MixBL texts and also using open-source libraries. The AI-based IDN is created to extract user intent from MixBL, the secondary language and BL texts. As the AI-based IDN is required to work with BL only, the training data is generated according to the goal/task of the chatbot in BL and is not required to process any other language. In an embodiment of the present disclosure, iterative scheme is followed to optimize the end-to-end pipeline of custom built LTN and IDN by fine-tuning the network parameters. This end-to-end pipeline processes the user utterances in MixBL and BL and allows the Natural Language Generation (NLG) in the BL to process the response by the chatbot.

In an embodiment of the present disclosure, the present disclosure eliminates the requirement to generate code-mixed data required to develop multilingual goal-oriented chatbots during both initial data generation stage and also when intent volume is being modified. This is achieved by separating training data of LTN and IDN. The present disclosure also scales up an equally efficient chatbot across multiple languages and mixture of languages. Furthermore, the present disclosure eliminates the requirement for word-level language identifiers in code-mixed business use-cases which further may reduce the performance of IDNs, inferencing time, and the like. The present disclosure also eliminates the confusion due to false cognates (i.e., the words with same spelling or pronunciation in multiple languages but with different meanings). This is a definite advantage when the chatbot is required to work in such multi-lingual domains. The present disclosure can efficiently handle novel/unique vocabulary, such as Hinglish (mix of Hindi and English) or Spanglish (mix of Spanish and English).

Further, the present subject matter accommodates even small volumes of code-mixed data for building AI-based IDN for multilingual chatbots. In an embodiment of the present disclosure, the AI-based IDN works completely in the BL as it works with the output transferred from the AI-based LTN. Therefore, the AI-based IDN does not require any code-mixed data to detect the intents for the chatbot to execute the one or more actions. The code-mixed data is used only by the AI-based LTN, such that the AI-based LTN MAY translate the code-mixed data chat to BL.

Further, business providers of several domains (e.g., healthcare, finance, retailers, and the like) who have customers in a bi-lingual community can take advantage of such a mixed-language understanding. In a use-case scenario of multilingual customer support chatbot for efficient business operations. A company aims to streamline its customer support operations by deploying a multilingual chatbot that can handle customer inquiries in various languages. The business goals include achieving efficient operations, avoiding the need for language domain experts to create intent-specific data, and providing excellent customer service without extensive target language data. By leveraging ultra-fast development techniques and minimizing the reliance on language domain experts, the company can accomplish its business objectives effectively. The company may expedite the development process by utilizing pre-trained multilingual language models that already possess a deep understanding of various languages. Rather than relying on language domain experts to create intent-specific data from scratch, the company can leverage the knowledge encoded in pre-trained models. This significantly reduces the development timeline and allows for quick deployment of the multilingual chatbot. In an embodiment of the present disclosure, developing an intent-specific data for each language typically requires substantial resources and expertise. However, by leveraging pre-trained models and fine-tuning techniques, the company can minimize the need for extensive target language data. The pre-trained models provide a solid foundation of language understanding, allowing the chatbot to handle intent classification effectively across multiple languages with minimal data requirements.

Further, the multilingual chatbot enables efficient customer support operations by providing immediate assistance in customers' preferred languages. With its ability to understand and classify intents accurately, the chatbot can efficiently address customer inquiries and provide relevant responses. This streamlines customer support processes, reduces response times, and enhances overall operational efficiency. Also, the company can easily scale its customer support services to a global audience by leveraging the multilingual chatbot. As the chatbot is trained to handle various languages, there is no need to develop separate language-specific models or rely on language domain experts for each language. This scalability ensures consistent and efficient customer support across multiple regions without the need for extensive manual intervention. Further, by avoiding the dependency on language domain experts to create intent-specific data and utilizing pre-trained models, the company can optimize costs associated with hiring language experts or collecting large amounts of target language data. The efficient development process and reduced data requirements contribute to cost optimization while maintaining the effectiveness of the multilingual chatbot.

Furthermore, leveraging ultra-fast development techniques and minimizing the reliance on language domain experts allows the company to achieve its business goals effectively. By utilizing pre-trained multilingual models, the company can accelerate development, minimize data requirements, and provide efficient customer support in multiple languages. This approach enables streamlined operations, eliminates the need for extensive language domain expertise, and optimizes costs, ultimately leading to excellent customer service and improved business outcomes.

The plurality of modules 108 may be implemented by any suitable hardware and/or set of instructions. Further, the sequential flow illustrated in FIG. 2 is exemplary in nature and the embodiments may include addition/omission of steps as per the requirement. In some embodiments, the one or more operations performed by the plurality of modules 108 may be performed by the processor/controller based on the requirement.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A method for identifying a user intent in a code-mixed utterance of a user, the method comprising:
   receiving the code-mixed utterance from the user for performing one or more actions via a chatbot, wherein the code-mixed utterance corresponds to one or more commands provided by the user to the chatbot in two or more source languages;
   segmenting the received code-mixed utterance into a set of tokens by using an Artificial Intelligence (AI)-based Language Translator Network (LTN);
   obtaining contextual information and contextual representations associated with the received code-mixed utterance based on the set of tokens by using the AI-based LTN;
   generating a fixed dimensional representation for each token of the set of tokens based on the obtained contextual information and the obtained contextual representations by using the AI-based LTN;
   generating a set of vocabulary probabilities for the fixed dimensional representation associated with each token of the set of tokens by using the AI-based LTN, wherein each vocabulary probability of the set of vocabulary probabilities corresponds to probabilities associated with the vocabulary of a target language;
   translating the code-mixed utterances to a translation text in the target language based on the generated set of vocabulary probabilities by using the AI-based LTN; and
   identifying the user intent in the translation text by using an AI-based Intent Detection Network (IDN).

2. The method of claim 1, wherein obtaining the contextual information and the contextual representations comprises:
   converting each token of the set of tokens into a fixed-dimensional vector by using the AI-based LTN;

determining an order of each token of the set of tokens in a sequence of the set of tokens based on the fixed-dimensional vector and positional information associated with each token of the set of tokens by using the AI-based LTN; and determining the contextual information and the contextual representations associated with the received code-mixed utterance based on the fixed-dimensional vector and the determined order of each token of the set of tokens, wherein the contextual information corresponds to the meaning of a current token from the set of tokens in relation to one or more surrounding tokens associated with the current token, and wherein the contextual representations are associated with linguistic properties of the code-mixed utterances.

3. The method of claim 1, wherein generating the fixed dimensional representation for each token of the set of tokens comprises:

obtaining contextual dependencies between each token of the set of tokens based on the obtained contextual information and the obtained contextual representations by using the AI-based LTN;

refining the obtained contextual information and the obtained contextual representations based on the obtained contextual dependencies by using a feedforward network;

identifying relevant information in the refined contextual information and the refined contextual representations by using an AI-based attention mechanism; and generating the fixed dimensional representation for each token of the set of tokens based on the identified relevant information by using the AI-based LTN.

4. The method of claim 1, wherein identifying the user intent in the translation text comprises:

segmenting the translation text into a plurality of translation tokens by using the AI-based IDN;

determining the user intent of the translation text based on the plurality of translation tokens by using the AI-based IDN;

identifying one or more entities in the translation text by using the AI-based IDN upon determining the user intent;

converting the plurality of translation tokens and the translation text into a set of embeddings by using the AI-based IDN upon identifying the one or more entities, wherein the set of embeddings represent a semantic meaning of the plurality of translation tokens and the one or more entities; and classifying the user intent into one or more predefined intent categories based on the determined user intent and the set of embeddings by using the AI-based IDN.

5. The method of claim 4, further comprising:

extracting one or more relevant entities from the translation text based on the determined user intent and the set of embeddings by using the AI-based IDN upon classifying the user intent; and identifying the one or more actions to be executed by the chatbot based on the classified user intent and the extracted one or more relevant entities by using the AI-based IDN.

6. The method of claim 5, wherein identifying the one or more actions comprises:

determining a dialogue state associated with the code-mixed utterance between the chatbot and the user based on the classified user intent and the extracted one or more relevant entities, wherein the dialogue state comprises one or more conversational parameters, and wherein the one or more conversational parameters comprise the user intent, entity values, and system actions;

determining one or more policies based on the determined dialogue state, wherein the one or more policies comprise rule-based policies, retrieval-based policies, and machine learning-based policies;

identifying the one or more actions to be executed by the chatbot based on the determined one or more policies and the one or more conversational parameters; and updating the one or more policies based on the identified one or more actions and the one or more conversational parameters.

7. The method of claim 1, wherein the target language is one of the two or more source languages.

8. The method of claim 1, further comprising:

receiving a source language text and a set of target language labels, wherein the set of target language labels are translations of the source language text in the target language;

segmenting the source language text into a plurality of source tokens;

transforming each of a set of input sequences associated with the received source language text into a fixed sequence length upon segmenting the source language text;

generating a set of positional encodings and a set of word embeddings for the source language text and the set of target language labels upon transforming each token of the set of input sequences;

translating the source language text into the target language based on the generated set of positional encodings and the generated set of word embeddings;

optimizing a set of hyper-parameters associated with the AI-based LTN upon translating the source language text into the target language;

updating a weight of the AI-based LTN upon optimizing the set of hyper-parameters; and obtaining a trained AI-based LTN model upon updating the weight of the AI-based LTN.

9. A system for identifying a user intent in a code-mixed utterance of a user, the system comprising:

a memory;

one or more processors communicably coupled to the memory, the one or more processors are configured to:

receive the code-mixed utterance from the user for performing one or more actions via a chatbot, wherein the code-mixed utterance corresponds to one or more commands provided by the user to the chatbot in two or more source languages;

segment the received code-mixed utterance into a set of tokens by using an Artificial Intelligence (AI)-based Language Translator Network (LTN);

obtain contextual information and contextual representations associated with the received code-mixed utterance based on the set of tokens by using the AI-based LTN;

generate a fixed dimensional representation for each token of the set of tokens based on the obtained contextual information and the obtained contextual representations by using the AI-based LTN;

generate a set of vocabulary probabilities for the fixed dimensional representation associated with each token of the set of tokens by using the AI-based LTN, wherein each vocabulary probability of the set of vocabulary probabilities corresponds to probabilities associated with the vocabulary of a target language;

translate the code-mixed utterances to a translation text in the target language based on the generated set of vocabulary probabilities by using the AI-based LTN; and identify the user intent in the translation text by using an AI-based Intent Detection Network (IDN).

10. The system of claim 9, wherein, for obtaining the contextual information and the contextual representations, the one or more processors (104) are configured to:

convert each token of the set of tokens into a fixed-dimensional vector by using the AI-based LTN;

determine an order of each token of the set of tokens in a sequence of the set of tokens based on the fixed-dimensional vector and positional information associated with each token of the set of tokens by using the AI-based LTN; and determine the contextual information and the contextual representations associated with the received code-mixed utterance based on the fixed-dimensional vector and the determined order of each token of the set of tokens, wherein the contextual information corresponds to the meaning of a current token from the set of tokens in relation to one or more surrounding tokens associated with the current token, and wherein the contextual representations correspond to representations which are associated with linguistic properties of the code-mixed utterances.

11. The system of claim 9, wherein, for generating the fixed dimensional representation for each token of the set of tokens, the one or more processors (104) are configured to:

obtain contextual dependencies between each token of the set of tokens based on the obtained contextual information and the obtained contextual representations by using the AI-based LTN;

refine the obtained contextual information and the obtained contextual representations based on the obtained contextual dependencies by using a feedforward network;

identify relevant information in the refined contextual information and the refined contextual representations by using an AI-based attention mechanism; and generate the fixed dimensional representation for each token of the set of tokens based on the identified relevant information by using the AI-based LTN.

12. The system of claim 9, wherein, for identifying the user intent in the translation text, the one or more processors are configured to:

segment the translation text into a plurality of translation tokens by using the AI-based IDN;

determine the user intent of the translation text based on the plurality of translation tokens by using the AI-based IDN;

identify one or more entities in the translation text by using the AI-based IDN upon determining the user intent;

convert the plurality of translation tokens and the translation text into a set of embeddings by using the AI-based IDN upon identifying the one or more entities, wherein the set of embeddings represent a semantic meaning of the plurality of translation tokens and the one or more entities;

classify the user intent into one or more predefined intent categories based on the determined user intent and the set of embeddings by using the AI-based IDN.

13. The system of claim 12, the one or more processors are configured to:

extract one or more relevant entities from the translation text based on the determined user intent and the set of embeddings by using the AI-based IDN upon classifying the user intent identify the one or more actions to be executed by the chatbot based on the classified user intent and the extracted one or more relevant entities by using the AI-based IDN.

14. The system of claim 13, wherein, in identifying the one or more actions, the one or more processors are configured to:

determine a dialogue state associated with the code-mixed utterance between the chatbot and the user based on the classified user intent and the extracted one or more relevant entities, wherein the dialogue state comprises one or more conversational parameters, and wherein the one or more conversational parameters comprise the user intent, entity values, and system actions;

determine one or more policies based on the determined dialogue state, wherein the one or more policies comprise rule-based policies, retrieval-based policies, and machine learning-based policies;

identify the one or more actions to be executed by the chatbot based on the determined one or more policies and the one or more conversational parameters; and update the one or more policies based on the identified one or more actions and the one or more conversational parameters.

15. The system of claim 9, wherein the target language is one of the two or more source languages.

16. The system of claim 9, wherein the one or more processors are configured to:

receive a source language text and a set of target language labels, wherein the set of target language labels are translations of the source language text in the target language;

segment the source language text into a plurality of source tokens;

transform each of a set of input sequences associated with the received source language text into a fixed sequence length upon segmenting the source language text;

generate a set of positional encodings and a set of word embeddings for the source language text and the set of target language labels upon transforming each token of the set of input sequences;

translate the source language text into the target language based on the generated set of positional encodings and the generated set of word embeddings;

optimize a set of hyper-parameters associated with the AI-based LTN upon translating the source language text into the target language;

update a weight of the AI-based LTN upon optimizing the set of hyper-parameters; and obtain a trained AI-based LTN model upon updating the weight of the AI-based LTN.

* * * * *